US008485053B2

(12) United States Patent
Lee et al.

(10) Patent No.: US 8,485,053 B2
(45) Date of Patent: Jul. 16, 2013

(54) INERTIAL STABILIZER SYSTEM

(75) Inventors: Jason Scott Lee, Oronoco, MN (US); Thomas S. Mazzeo, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1234 days.

(21) Appl. No.: 12/346,274

(22) Filed: Dec. 30, 2008

(65) Prior Publication Data
US 2010/0162835 A1 Jul. 1, 2010

(51) Int. Cl.
*G01C 19/54* (2006.01)

(52) U.S. Cl.
USPC .......................................... 74/5.4

(58) Field of Classification Search
USPC ........................ 74/5 R–5.95; 701/1
See application file for complete search history.

(56) References Cited

U.S. PATENT DOCUMENTS

| | | | |
|---|---|---|---|
| 4,789,210 A | 12/1988 | Weiss et al. | |
| 4,836,624 A | 6/1989 | Schwickrath | |
| 5,156,451 A | 10/1992 | Pollack | |
| 5,205,627 A | 4/1993 | Davison et al. | |
| 5,913,582 A | 6/1999 | Coonan | |
| 6,158,601 A | 12/2000 | Baker et al. | |
| 6,360,838 B1 * | 3/2002 | Kulhavy | 180/219 |
| 6,636,418 B1 | 10/2003 | Claprood et al. | |
| 6,668,846 B2 * | 12/2003 | Meador | 135/65 |
| 6,688,708 B1 | 2/2004 | Janson | |
| 6,843,180 B1 | 1/2005 | Keaton | |
| 6,857,711 B1 | 2/2005 | Straus | |
| 6,973,847 B2 * | 12/2005 | Adams et al. | 74/5.47 |
| 7,240,630 B2 * | 7/2007 | Akers | 114/122 |
| 2003/0010554 A1 * | 1/2003 | Grong et al. | 180/218 |
| 2004/0227443 A1 | 11/2004 | Sandoval | |
| 2005/0274210 A1 * | 12/2005 | Adams et al. | 74/5.4 |
| 2007/0119794 A1 | 5/2007 | Hidaka et al. | |
| 2007/0178369 A1 | 8/2007 | Conrardy et al. | |
| 2008/0047375 A1 * | 2/2008 | Sonoura | 74/5.22 |
| 2010/0263463 A1 * | 10/2010 | Janosik | 74/5.4 |

\* cited by examiner

*Primary Examiner* — Troy Chambers
*Assistant Examiner* — Michael Gonzalez
(74) *Attorney, Agent, or Firm* — Yee & Associates, P.C.; Steven L. Bennett

(57) ABSTRACT

The illustrative embodiments provide a method and apparatus for stabilizing an electronic rack structure. In one embodiment the apparatus comprises an enclosure with a user interface panel. The apparatus also comprises a gyroscope, sensor system and controller attached within an enclosure. A sensor system associated with the gyroscope is capable of detecting a tilt of an electronic rack structure. A controller is also located within the enclosure and is capable of detecting the tilt of the electronic rack structure and controlling an orientation of the gyroscope to counter the tilt of the electronic rack structure in response to detecting the tilt. In another illustrative embodiment, a method for stabilizing an electronic rack structure is provided.

6 Claims, 8 Drawing Sheets

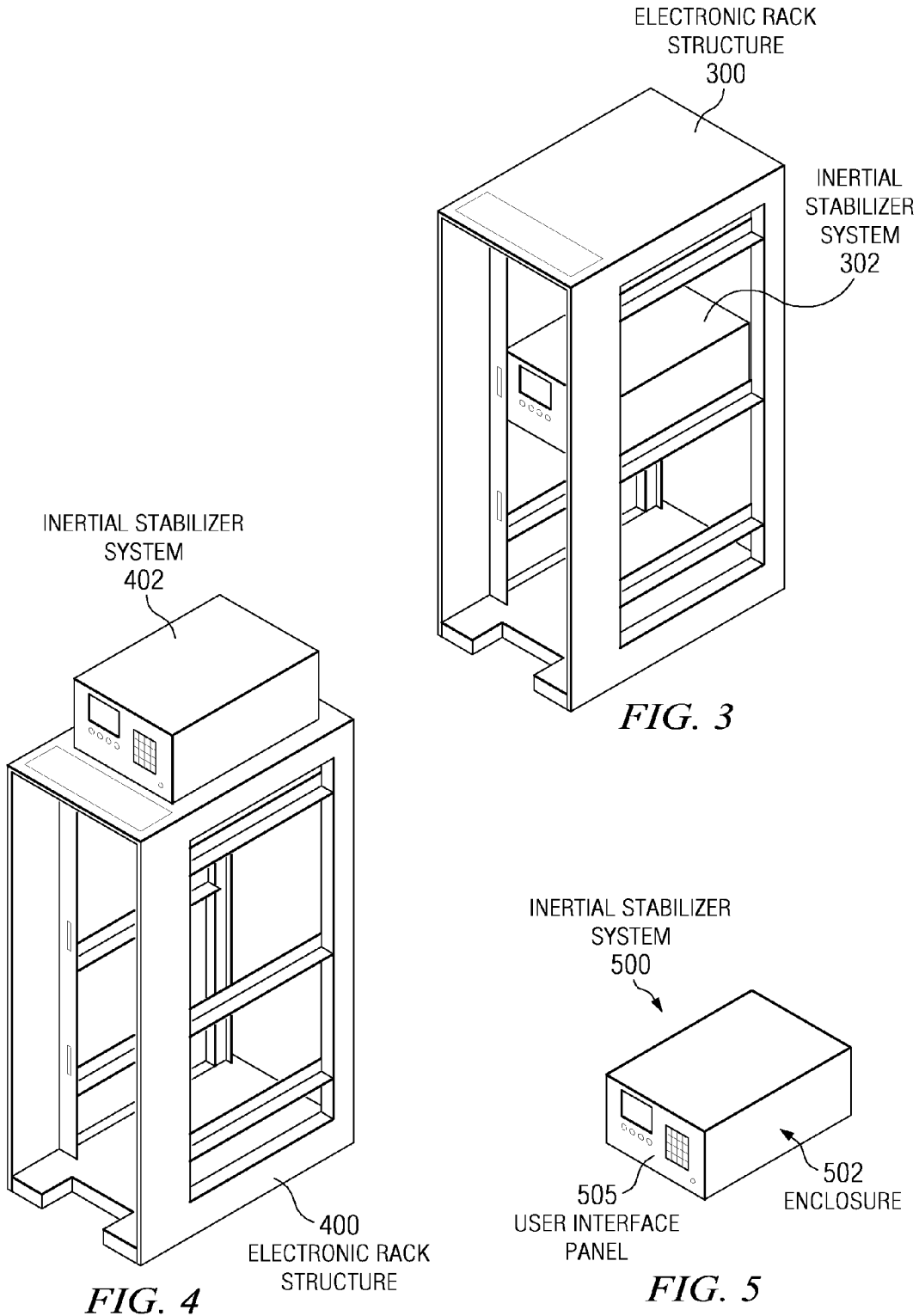

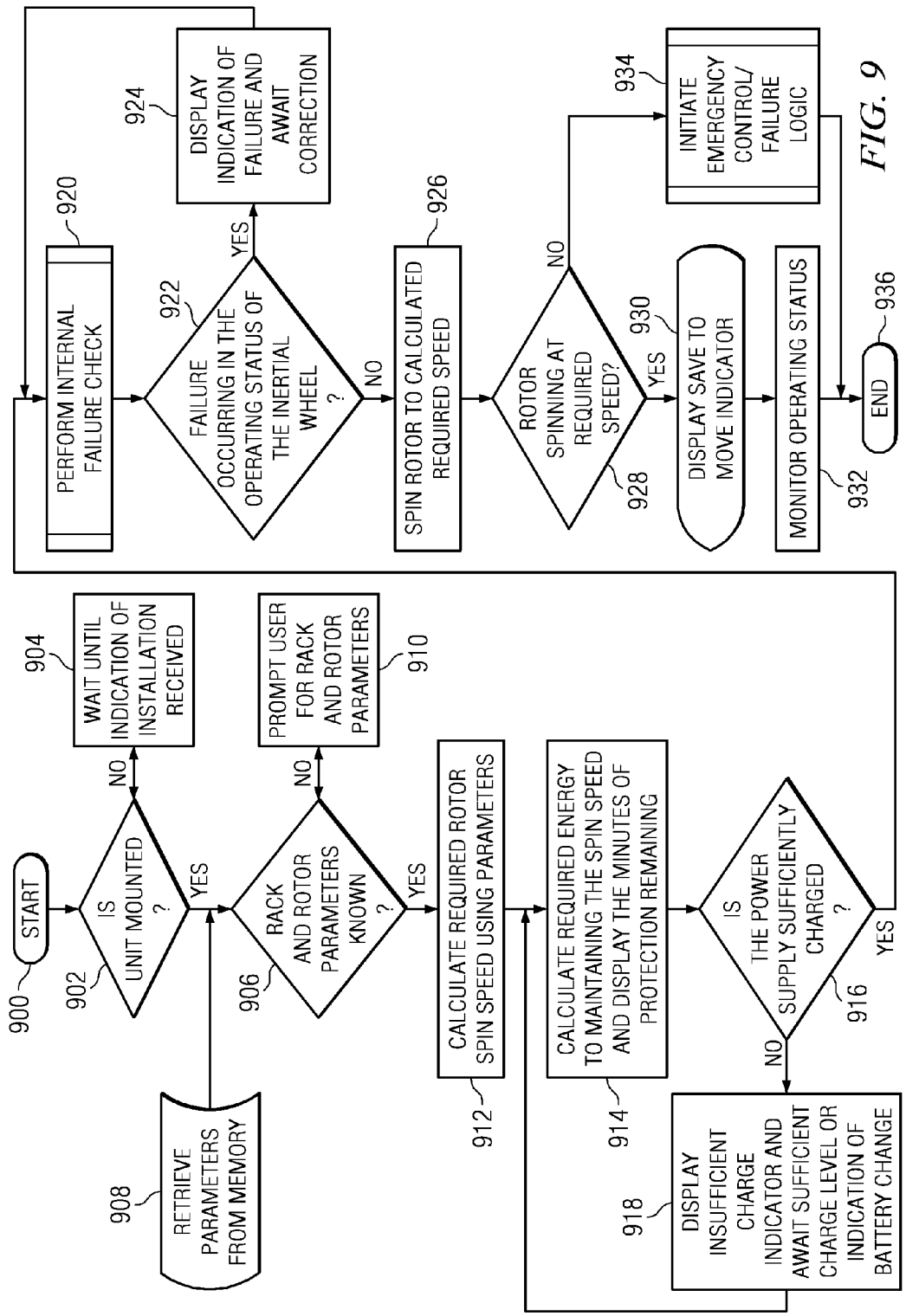

INERTIAL STABILIZER SYSTEM

BACKGROUND OF THE INVENTION

1. Field of the Invention

The disclosure relates to an improved data processing system and, in particular, to a method and apparatus for stabilizing objects. Still more particularly, the present disclosure relates to a method, apparatus, and a computer program product for stabilizing a computer electronic rack structure.

2. Description of the Related Art

Electronic rack structures provide an effective way of aggregating electronic components and computer equipment in a compact storage space. Most rack structures are designed to comply with Electronic Industry Association (EIA) standards. Standard 19" electronic rack structures are designed typically to house a column of electronic components that are 17¾" in width and of varying depths. The height of an electronic component can vary but to be compatible with the standard rack, the component must be an integer multiple of an Electronic Industry Association unit, referred to as a "U." An Electronic Industry Association U is 1.75 inches. Most electronic and computer components are designed with a height in multiples of "U's." For example, 1 U (1.75"), 2 U (3.50"), 3 U (5.25"), etc. Standard racks are available in a wide assortment of heights, but a typical height is 42 U tall. Electronic components are typically mounted on vertical supports in the rack. The rack generally comprises a rectangular frame covered by removable panels and a pivotable front-access door.

To facilitate movement of a standard rack, wheels are generally inset under the base of the rack. The placement of the wheels on the electronic rack structure, inset under the base, allows for the racks to be compacted together when placed side-by-side. However, this placement of the wheels also contributes to an increased risk of the rack tilting during a movement of the rack.

An issue for installers, supply chain providers and customers tasked with moving these rack structures, whether empty of fully-integrated with equipment, is maintaining a low center of gravity of the rack, so that the rack remains upright when being moved from one location to its final installation location. When the center of gravity of the rack is too high, instability during the rack movement can increase the risk of the rack tilting over, resulting in either property damage or human injury. This risk is most prevalent when the rack is loaded with devices, especially when devices are located near the top of the rack.

In attempts to overcome the tendency of a rack tipping over, manufacturers and integrators of rack structures specify a risk of tilt by defining the static angle, in degrees, that the rack can be tilted without reaching the point where the rack actually falls over. However, in instances where the tilt angle is larger than the tilt angle specified by the manufacturer, the probability that the rack will tilt over and fall still exists.

BRIEF SUMMARY OF THE INVENTION

The illustrative embodiments provide an apparatus for stabilizing an electronic rack structure. In one embodiment, the apparatus comprises an enclosure with a user interface panel. The apparatus also comprises a device capable of generating a force, such as a gyroscope, to resist a tilt of a structure. The device is attached within an enclosure. A sensor system and controller are connected to the device and also attached within the enclosure. The sensor system associated with the device is capable of detecting a tilt of the electronic rack structure in or on which the apparatus is mounted. A controller is also located within the enclosure and is capable of detecting the tilt of the electronic rack structure and controlling an orientation of the device to counter the tilt of the electronic rack structure in response to detecting the tilt.

In another illustrative embodiment, a method for stabilizing an electronic rack structure is provided. The method comprises operating an inertial stabilizer system attached to the electronic rack structure. A sensor system is used to monitor the electronic rack structure for a tilt of the electronic rack structure. When a tilt is detected the orientation of the gyroscope within the inertial stabilizer system is changed to generate a force to oppose the tilt.

In yet another illustrative embodiment, a computer program product for stabilizing an electronic rack structure. The computer program product comprises a computer-readable recordable storage medium having program code for calculating a rotor spin speed in response to receiving a plurality of inputs, program code for determining a required energy level to maintain the rotor spin speed, program code for determining whether a power supply associated with the inertial stabilizer system is sufficiently charged, program code for determining whether a failure is occurring in the operation of the inertial stabilizer system, and program code for determining whether a rotor of the inertial stabilizer system is spinning at a calculated rotor spin speed.

BRIEF DESCRIPTION OF THE SEVERAL VIEWS OF THE DRAWINGS

FIG. 3 is a pictorial representation of an electronic rack structure with an internally attached inertial stabilizer system in accordance with an illustrative embodiment;

FIG. 4 is another pictorial representation of an electronic rack structure with an externally attached inertial stabilizer system in accordance with an illustrative embodiment;

FIG. 5 is a diagram of an inertial stabilizer system in accordance with an illustrative embodiment;

FIG. 9 is a flowchart illustrating a method for using an inertial stabilizer system in accordance with an illustrative embodiment.

DETAILED DESCRIPTION OF THE INVENTION

Figure 1:
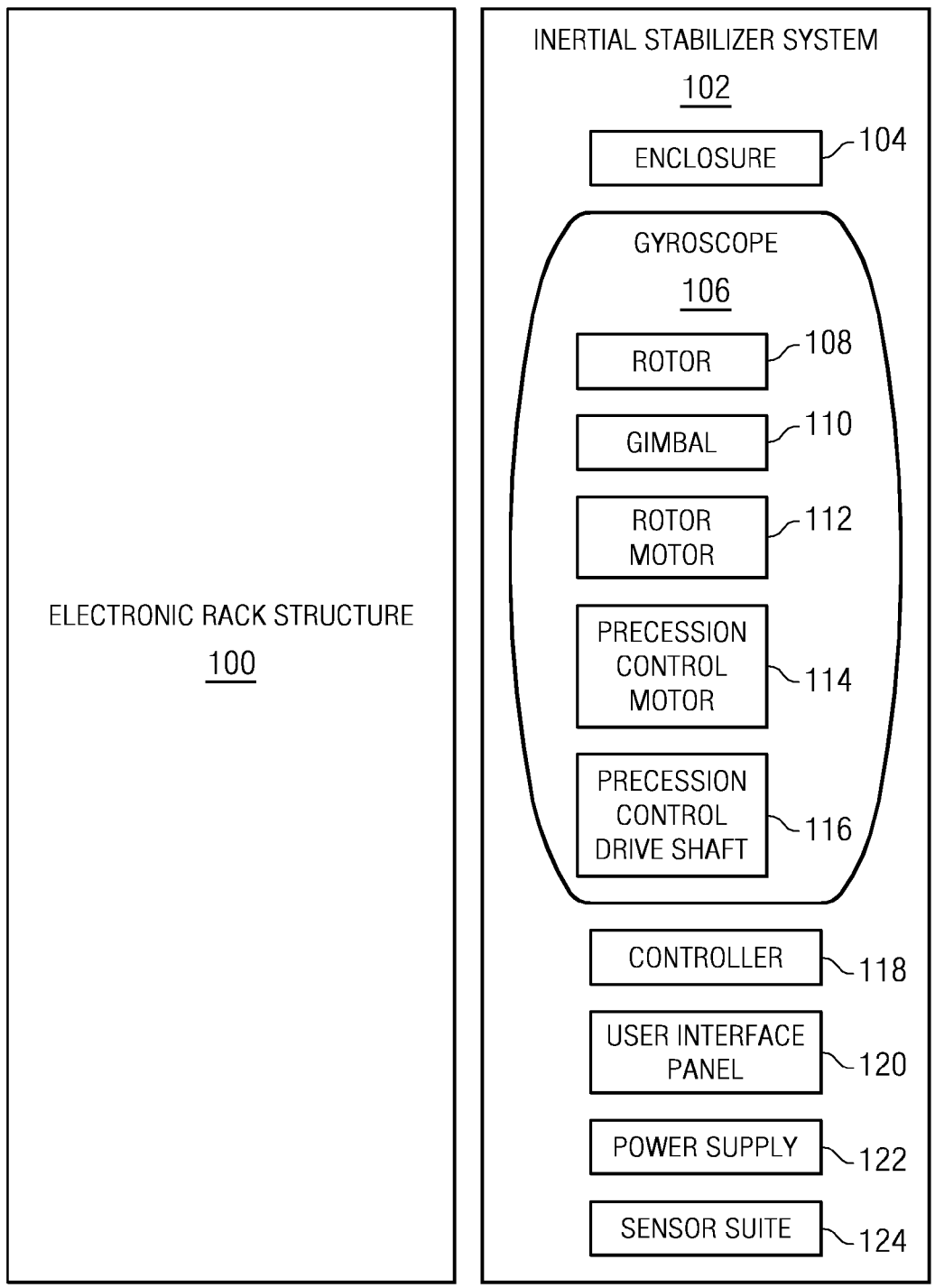
FIG. 1 is a block diagram of an inertial stabilization environment in accordance with an illustrative embodiment.

The illustrative embodiments described herein are directed toward an apparatus, method, and computer program product for stabilizing objects. Still more particularly, the present disclosure relates to a method, apparatus, and a computer program product for stabilizing a computer electronic rack structure. In an illustrative example, an inertial stabilizer system comprises an apparatus for maintaining the upright orientation of an electronic rack structure in which an inertial stabilizer system is attached. The inertial stabilizer system comprises a device that generates a force to resist a tilt of a structure, such as a gyroscope, attached within an enclosure. A sensor system and a controller are connected to the device and also attached within an enclosure. A user interface panel attached to the front side of the enclosure communicates an operation status of the inertial stabilizer system and allows for receiving parameters from a user.

A current practice used to minimize the tilt risk of an electronic rack structure includes adding weight, such as ballasts, to the bottom of the rack to lower the center of mass. Adding weight to the bottom of the rack is particularly useful when moving empty or partially empty electronic rack structures. However, adding weight to the electronic rack structure increases shipping costs for the customer purchasing the electronic rack structure. The manufacturer also incurs the additional costs of adding hundreds of pounds of ballasts to the electronic rack structure, and in shipping the heavier enclosure within its supply chain prior to order fulfillment. Additionally, adding the weights to the electronic rack structure takes up valuable space in the bottom of the electronic rack structure or requires that the rack be taller or wider to maintain its useful capacity. Finally, adding ballast weights may also reduce the total amount of weight of computer equipment the rack can support because the total weight limit for its casters or a customer's elevator or raised floor may be exceeded.

Another practice used to minimize electronic rack structure tilt, is adding outriggers to the electronic rack structure. Outriggers require the person moving the electronic rack structure to swing out the wheels to widen the base of the electronic rack structure, resulting in increased stability. This approach is fairly effective, but adds significant cost to the electronic rack structure for the addition of a feature that is only used in moving the electronic rack structure to a final install position. This approach also significantly adds to the width of the rack, that results in the electronic rack structure not being able to fit through 'choke points' such as doorways. Additionally, when outriggers are used, the outriggers have to be folded in while moving through these choke points, resulting in an increased risk of tilt while the protective devices are not deployed. Still another practice is to remove some or all of the components from the electronic rack structure starting from the top, to lower the center of gravity sufficiently to achieve a safe tilt threshold before moving the electronic rack structure. In reality, a number of the above practices are generally required to achieve the required stability to safely move the rack.

Thus, the illustrative embodiments provide a method and apparatus to reduce the occurrence of instability in the electronic rack structure that could result in tilt-over during movement of the electronic rack structure. The different embodiments may eliminate the need for emptying the electronic rack structure, or adding weight the bottom of the electronic rack structure, to lower the center of gravity of the electronic rack structure. Eliminating this need for adding additional weight to the bottom of the electronic rack structure results in reduced shipping costs for the manufacturer, installer, and customer. Additionally, illustrative embodiments are attached. This allows a user to move any number of electronic rack structures as long as the electronic rack structure has at least one area in or on top of the electronic rack structure in which the inertial stabilizer system can be attached.

FIG. 1 is a block diagram of an inertial stabilization environment in accordance with an illustrative embodiment. Specifically, FIG. 1 shows, in an illustrative embodiment of the invention, electronic rack structure 100 configured in accordance with the Electronic Industry Association standards. Exemplary electronic rack structures include server racks and electronic component racks. FIG. 1 also shows inertial stabilizer system 102, which may be implemented on electronic rack structure 100. Inertial stabilizer system 102 comprises enclosure 104, gyroscope 106, rotor 108, gimbal 110, rotor motor 112, precession control drive shaft 116, controller 118, user interface panel 120, power supply 122, and sensor suite 124.

Enclosure 104 may be constructed from any number of materials, depending on the particular implementation. In these examples, the materials may be selected from one of aluminum, steel, a composite material, and/or some other suitable material. In some embodiments, weight is a consideration and a light-weight metal, such as aluminum may be used.

Enclosure 104 completely encases gyroscope 106. Enclosure 104 is designed to conform to Electronic Industry Association standards for rack-mounted components. Electronic Industry Association standards govern the physical characteristics of an electronic component, such as width, depth, height, and other suitable physical characteristics of the component. It should be appreciated that illustrative embodiments can be employed in non-compliant Electronic Industry Association structures without departing from the scope of the various embodiments. Of course, enclosure 104 may be designed in any manner for use with electronic rack structure 100.

Gyroscope 106 in these illustrative examples is a device for maintaining electronic rack structure 100 in a vertical orientation. Gyroscope 106 comprises rotor 108 coupled to precession control drive shaft 116. Precession control drive shaft 116 is powered by rotor motor 112, which is coupled to gimbal 110. Gimbal 110 is also powered driven by precession control drive shaft 116. Rotor 108 is powered by rotor motor 112 so that rotor 108 continuously spins about precession control drive shaft 116, defining an angular momentum about the rotor axis. Gimbal 110 is driven by precession control motor 114, which operates to ensure movement of gyroscope 106 in a direction transverse to the axis of rotation of the rotor 108. Precession control motor 114 will generate a force to stabilize electronic rack structure 100.

When a tilt, which is the angle of the electronic rack structure 100 with respect to the vertical orientation, is detected which exceeds the critical threshold where the electronic rack structure 100 can fall over on its side, precession control motor 114 induces a force that causes rotor 108 to rotate about the precession control drive shaft 116 at right angles to an axis of rotation, to oppose the detected tilt. Rotor motor 112 and precession control motor 114 operate to ensure the movement of gyroscope 106 is in a direction transverse to the direction of the tilt of electronic rack structure 100. In this instance, the movement of gyroscope 106 will generate a force to resist the tilt of electronic rack structure 100, in response to a determined or sensed tilt of the electronic rack structure 100. The result of this is that the effective center of gravity of the rack is lowered.

Inertia stabilizer system 102 also includes controller 118. Controller 118 uses the parameters, for example information describing physical characteristics of electronic rack structure 100, which may include size and weight of the rack, size and weight of installed devices. Parameters may also include rotor mass, rotor diameter, motor torque, battery capacity. Additionally, parameters may also be stored in a memory coupled to controller 118. These parameters may be stored when computer electronic component devices are installed in the rack and these parameters may comprise information regarding the weight and location of each device installed in the electronic rack structure 100, as well as the weight and center of mass of electronic rack structure 100. This information is used to determine the overall center of gravity of electronic rack structure 100. Additional information may include the length of time the electronic rack structure 100 movement is to take place and the angle of any inclines (up or down) on which the electronic rack structure 100 will be pushed (such as to a raised floor). In illustrative embodiments, this information could be uploaded automatically from a data model that represents a customer ordered configuration and device placement. This information will provide a more accurate determination of the magnitude of the tilt-resistance forces required to oppose a tilt of electronic rack structure 100 and also provide a determination whether the stored energy of the control system is enough to cover the safety of the entire move. These parameters are used to operate the gyroscope 106 in a manner to oppose a tilt of an electronic rack structure in instance where the tilt exceeds a safety threshold. Therefore, when a tilt of electronic rack structure 100 beyond safe limits is detected, the gyroscope 106 will drive the tilting electronic rack structure 100 in a direction to oppose the tilt. This operation results in an effective lowering of the center of gravity of electronic rack structure 100 to stabilize the electronic rack structure.

Controller 118 also communicates with user interface panel 120. User interface panel 120 allows a user to input parameters describing any physical characteristics of electronic rack structure 100 and the devices installed on the electronic rack structure to the extent that such parameters are not already known. These parameters may also stored in a memory coupled to controller 118 retrieved as program constants and data provided as part of the process where the devices were installed in the rack.

Power supply 122 provides power to rotor motor 112, precession control motor 114, controller 118, and sensor suite 124. Power supply 122 may be, for example, a rechargeable battery, but any other suitable device that supplies power may be used.

Sensor suite 124 sends information to controller 118 about the tilt position of electronic rack structure 100 relative to the ground as well as any accelerations taking place about the tilt axis of electronic rack structure 100.

Inertial stabilizer system 102 in FIG. 1 is not meant to imply physical or architectural limitations to the manner in which different illustrative embodiments may be implemented. Other illustrative embodiments may include other components in addition to or in place of the ones illustrated. Also, of the components illustrated, individual components may be divided into additional components or combined into fewer components, depending on the implementation.

For example, controller 108 may be implemented in any combination of one or more computer-usable, computer-storable or computer-readable medium(s) which may be an electronic, magnetic, optical, electromagnetic, infrared, or semiconductor system, apparatus, or device. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable, computer-storable or computer-readable medium may be any medium that can contain, store, communicate, propagate, or transport the program for use by, or in connection with, the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wired, optical fiber cable, radio frequency, or other suitable medium.

Computer program code for carrying out operations of an embodiment may be written in any combination of one or more programming languages, including an object-oriented programming language such as Java, Smalltalk, C++ or the like, and conventional procedural programming languages, such as the "C" programming language or similar programming languages. The program code may execute entirely on the controller, partly on another computer associated with illustrative embodiments, as a stand-alone software package, partly on a remote computer, or entirely on the remote computer or server. In the latter scenario, the remote computer may be connected to the controller through any type of network, including a local area network (LAN) or a wide area network (WAN), or the connection may be made to an external computer (for example, through the Internet using an Internet Service Provider).

Figure 2:
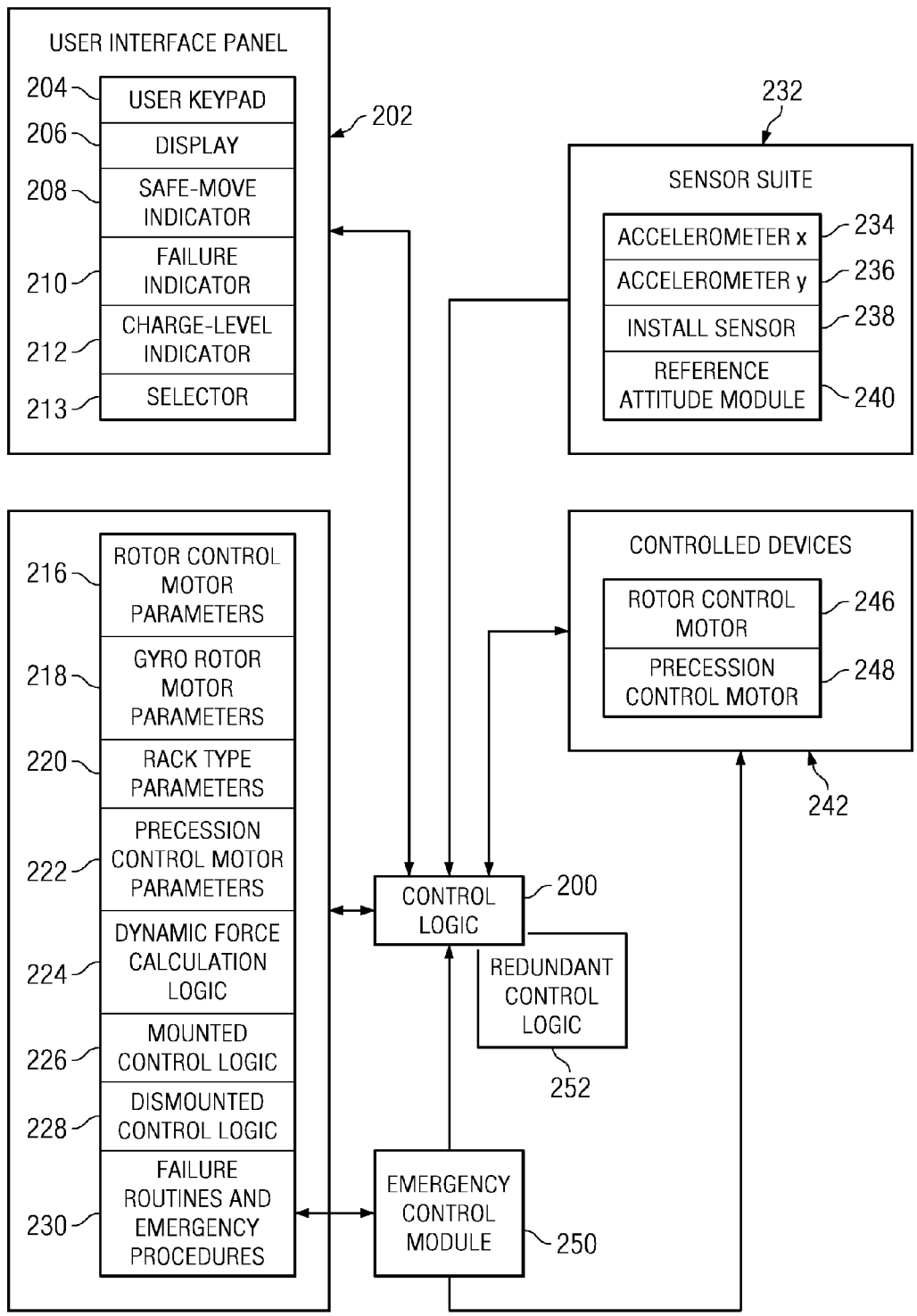
FIG. 2 is a block diagram of the control logic for implementing a control system for an illustrative embodiment.

FIG. 2 is a block diagram of the control logic for implementing a control system for an illustrative embodiment. In FIG. 2, an embodiment is implemented with redundant control logic 252. Redundant control logic 252 provides a fail safe by preventing instances where control logic 200 drives the gyroscope in a direction that complements the tilt movement instead of opposing the tilt movement. This is not meant to limit the scope of the invention as other fail-safe programming procedures and logic known to those skilled in the art may be utilized. Control logic 200 may be implemented by a controller, such as controller 108 of FIG. 1.

Before moving an electronic rack structure from one location to another, the controller receives parameters from a user entering parameters via keypad 204 on user interface panel 202. Safe-move indicator 208, failure indicator 210, and charge-level indicator 212 provide input to the controller regarding the operating status of the gyroscope, such as gyroscope 106 of FIG. 1. Display 206 is used by the controller to provide operating status information to a user or to request additional input from the user. Inputs are also received from the sensors in sensor suite 232. The sensors in sensor suite 232 comprise accelerometer x 234 and accelerometer y 236, install sensor 238, and reference attitude module 240.

Control logic 200 also receives feedback from controlled devices 242. Controlled devices 242, of an exemplary embodiment, comprises rotor control motor 246 and precession control motor 248 and communicates to the controller whether a rotor of the inertial stabilizer system is spinning at the speed calculated to create the angular momentum needed for tilt control and whether the precession control motor is driving or can drive the gimbal in the correct direction and at the right angular acceleration and velocity to resist anticipated tilt forces. The controller retrieves parameters and routines 214 from a memory coupled to the controller, which include rotor control motor parameters 216, gyro rotor motor parameters 218, rack type parameters 220, and precession control motor parameters 222. These parameters provide input on the physical characteristics of the motors, such as the motor weight and the amount of force created by the motors, as well as physical characteristics regarding different types of electronic rack structures onto which various embodiments may be attached. Each parameter also incorporates data received from user interface panel 202. In a different embodiment, the user interface panel 202 also comprises selector 213 for selecting a spin speed for the gyroscope. The selected spin speed is also provided to the controller as input.

In response to receiving a plurality of parameters, the controller executes dynamic force calculation logic 224 to determine the force that needs to be applied by the gyroscope to resist a tilt of electronic rack structure in one direction or another. Dynamic force calculation logic 224 determines, based on the inputs, what force is needed by precession control motor 248 to create a force that resists a tilt of the electronic rack structure.

Mounted unit control logic 226 determines whether rotor motor 246 and precession control motor 248 are active. This logic also determines whether the speed of the motors needs to be increased to resist a tilt of electronic rack structure. Dismounted control logic 228 determines that in the absence of an impending tilt, the motors can be spun down to a normal operating speed to facilitate dismounting the inertial stabilizer system from the electronic rack structure. Failure routines and emergency procedures 230 are used by emergency control module 250, which communicates with the controller to shut down the gyroscope when a failure in the operation of the gyroscope occurs. Fault codes are also provided to a user to determine which component of the embodiment is failing.

FIG. 3 is a pictorial representation an electronic rack structure with an internally attached inertial stabilizer system, in accordance with an illustrative embodiment. With reference to FIG. 3, inertial stabilizer system 302, similar to inertial stabilizer system 102 of FIG. 1, is attached in electronic rack structure 300. It is well understood in the art that electronic rack structure 300, as depicted in FIG. 3, is configured to hold a number of electronic and/or computer devices. "A number" as used herein refers to one or more items. For example, a number of electronic devices are one or more electronic devices.

FIG. 4 is another pictorial representation an electronic rack structure with an externally attached inertial stabilizer system, in accordance with an illustrative embodiment. FIG. 4 shows electronic rack structure 400 with an externally attached inertial stabilizer system 402, similar to inertial stabilizer system 102 of FIG. 1, in accordance with an illustrative embodiment. In this illustrative example, inertial stabilizer system 402 is removeably attached to the top of electronic rack structure 400. Mounting of inertial stabilizer system 402 may be accomplished using various known methods. For example, inertial stabilizer system 402 may be bolted, screwed, snapped, and/or attached with some other suitable process to electronic rack structure 400. Mounting inertial stabilizer system 402 ensures that the enclosure of inertial stabilizer system 402 is affixed to electronic rack structure 400 so that inertial stabilizer system 402 is unitized with the rack.

FIG. 5 is a diagram of an inertial stabilizer system, in accordance with an illustrative embodiment. With reference to FIG. 5, inertial stabilizer system 500 comprises a gyroscope attached within enclosure 502. Enclosure 502 completely encases the gyroscope. Enclosure 502 comprises user interface panel 505 on the front side of enclosure 502.

Figure 6:
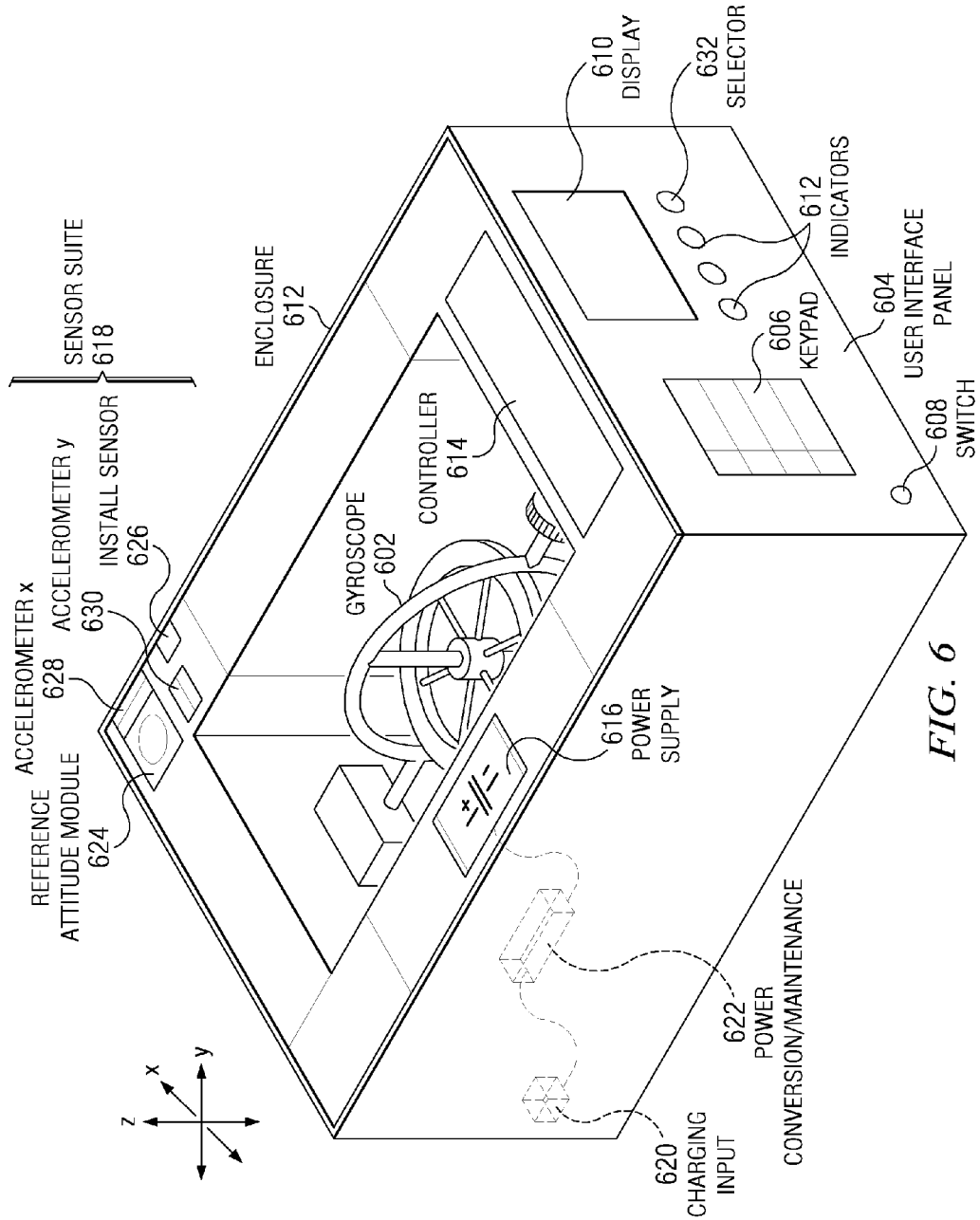
FIG. 6 is a perspective view of inertial stabilizer system in accordance with an illustrative embodiment.

FIG. 6 is a perspective view of an inertial stabilizer system, in accordance with an illustrative embodiment. FIG. 6 illustrates an exposed view of inertial stabilizer system 600. Inertial stabilizer system 600 is an example of one implementation of inertial stabilizer system 100 in FIG. 1.

Gyroscope 602 is attached inside enclosure 612. User-interface Panel 604 is attached on the front side of enclosure 612 and comprises keypad 606, switch 608, display 610, and a number of light emitting diode (LED) indicators 612. Light emitting diode indicators 612 and display 610 are used to communicate an operational status of gyroscope 602. The operational status communicated includes whether gyroscope 612 is safe to move and is operating properly, and identifies a period of time the safe movement can be maintained as dictated by the charge-level of power supply 616.

Keypad 606 is used by a user to input parameters that define the physical specifications of an electronic rack structure that inertial stabilizer system 600 will be attached. The parameters describe, for example, the height and weight of the electronic rack structure and weight and location of devices installed in the electronic rack structure. These parameters are used by controller 614 to determine the spin speed at which the gyroscope should operate to generate a force to resist a tilt in the electronic rack structure as well as determining the required precession control motor drive energy needed to generate the required amount of anti-tilt force.

Power supply 616 provides power to gyroscope 612, controller 614, and sensor suite 618. In these illustrative examples, power supply 616 may be charged via charging input 620 which is connected to an electric output. Power conversion/maintenance 622 operates in communication with charging input 620 and converts alternating current (AC) power to direct current (DC) power to charge power supply 616, and maintain the charge level of power supply 616.

Sensor suite 618 comprises reference attitude module 624, install sensor 626, accelerometer x 628, and accelerometer y 630. Sensor suite 618 detects and communicates to controller 614 the tilt position, velocity, and acceleration of the electronic rack structure relative to the ground. Reference attitude module 624 defines the attitude of gyroscope 612 with respect to the ground. This information is provided to controller 614 to indicate whether an embodiment, as attached in an electronic rack structure, is level with the ground or tilted at an angle. Accelerometer x 628 and accelerometer y 630 measure the velocity and acceleration in the x and y direction, and indicate whether the electronic rack structure is tilting at a constant rate in one direction or any other or whether the rate of tilting is increasing. Install sensor 626 determines whether inertial stabilizer system 600 is properly attached and installed in the electronic rack structure. Those skilled in the art will recognize that mounting the embodiment can be accomplished using several methods. For example, inertial stabilizer system 600 may be bolted, screwed, snapped, welded, or glued onto electronic rack structure. Mounting sensor, such as a microswitch, magnetic proximity sensor, or any other similar device ensures that inertial stabilizer system 600 is attached to the electronic rack structure in a manner that ensures that any forces generated by the gyroscope are transmitted to the electronic rack structure.

Controller 614 is configured to receive parameters from accelerometer x 628 and accelerometer y 630 and reference attitude module 624 which indicates the position of gyroscope 602 with respect to the ground. Keypad 606 on user interface panel 604 allows for user inputs which are also used by controller 614. In another embodiment, inputs are received from selector 632. Selector 632 allows a user to select from a set of operating programs. Each operating program uses a different set of control algorithms that may be selected. Exemplary control algorithms may include an extended battery run time algorithm, an aggressive anti-tilt control algorithm, or a shorter battery life algorithm. Other selectable control algorithms or methods of operation of illustrative embodiments are not precluded by these examples. Controller 614 uses these inputs to drive the precession control drive shaft and motor in a clockwise or counter-clockwise direction, at an angular velocity so it generates a force to oppose an impending tilt in the electronic rack structure. These parameters can also be stored in a storage area, such as a read access memory (RAM) or read only memory (ROM) associated with controller 614, for later retrieval by controller 614.

When accelerometer x 623, accelerometer y 630 and reference attitude module 624 sense a motion indicating that the electronic rack structure is starting to tilt, this information is sent to controller 614. Controller 614 drives the precession control drive shaft and motor to generate a force in a direction transverse to the tilting electronic rack structure. Therefore, as the electronic rack structure starts to tilt, the precession control will drive the tilting electronic rack structure in the other direction thereby lowering the center of gravity and stabilizing the rack against falling over.

Figure 7:
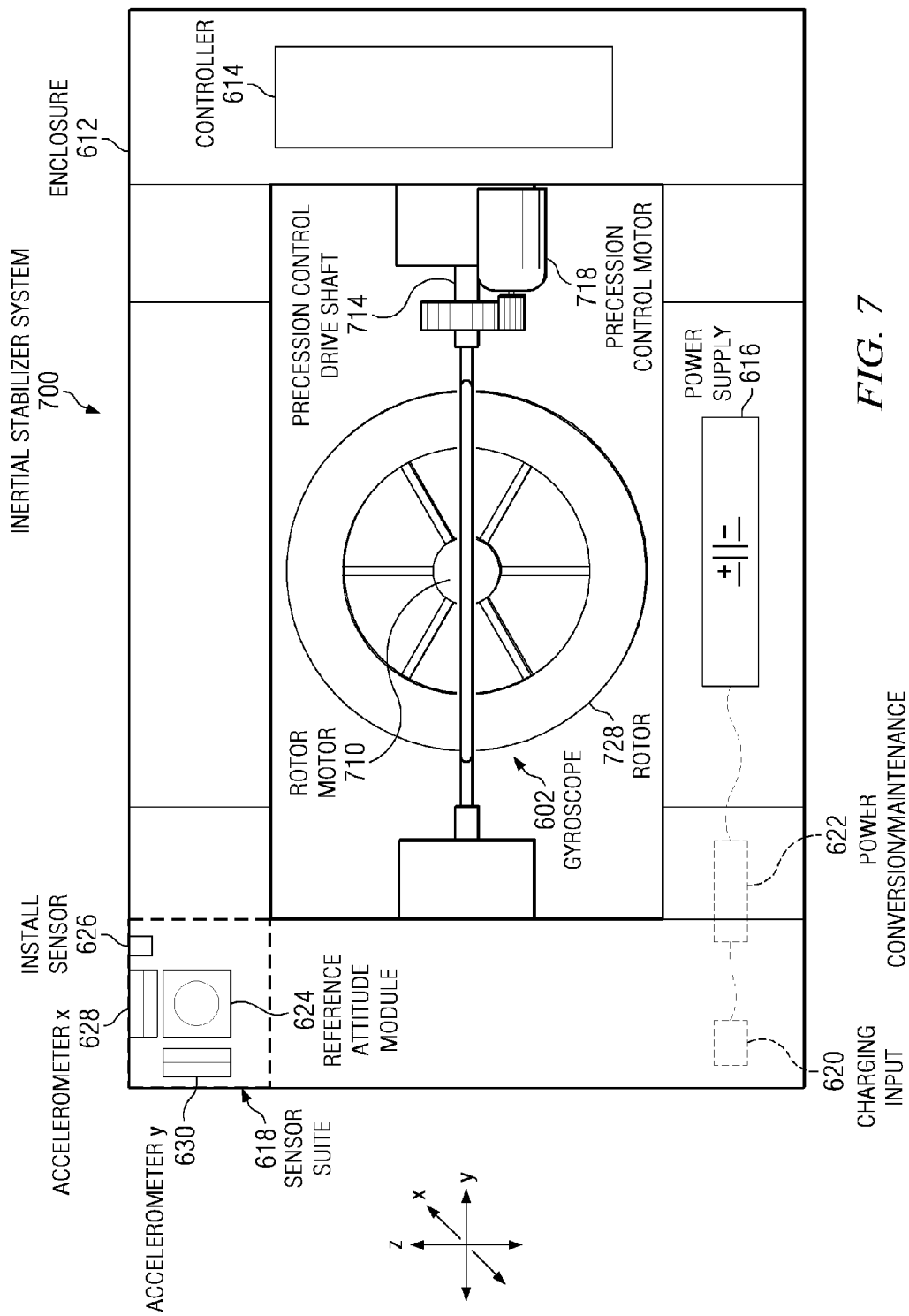
FIG. 7 is a top perspective view of an inertial stabilizer system in accordance with an illustrative embodiment.

FIG. 7 is a top perspective view of an inertial stabilizer system, according to inertial stabilizer system 600 of FIG. 6. FIG. 7 illustrates an exposed view of an illustrative embodiment. With reference to FIG. 6, Gyroscope 602 is attached inside enclosure 612 in such a way as to have one degree of freedom with respect to its orientation. Gyroscope 602 comprises rotor motor 710, precession control motor 718, and precession control drive shaft 714. Rotor motor 710 spins up rotor 728 of gyroscope 712 to a predetermined rotational velocity. This velocity is determined by calculating the angular momentum required using the rotor mass and weight distribution, or distance, from the axis. Precession Control motor 718 controls the movement of gyroscope 602 and ensures that gyroscope 602 movement is in a direction transverse to the rotor axis of rotation. This movement will generate a force to lower the effective center of gravity of the electronic rack structure, to resist the tilt of the electronic rack structure, in response to the determined or sensed tilt of the electronic rack structure.

Controller 614 is configured to receive a plurality of inputs from sensor suite 618, rotor motor 710, precession control motor 718, and a user via a keypad on the user interface panel. In response to detecting tilt movement of a rack structure, controller 614 determines the force required to oppose the tilt and drives the precession control motor 718 to generate that force. As a result, as the electronic rack structure starts to tilt, precession control motor 714 will drive the tilting electronic rack structure in the other direction thereby effectively lowering the center of gravity.

Figure 8:
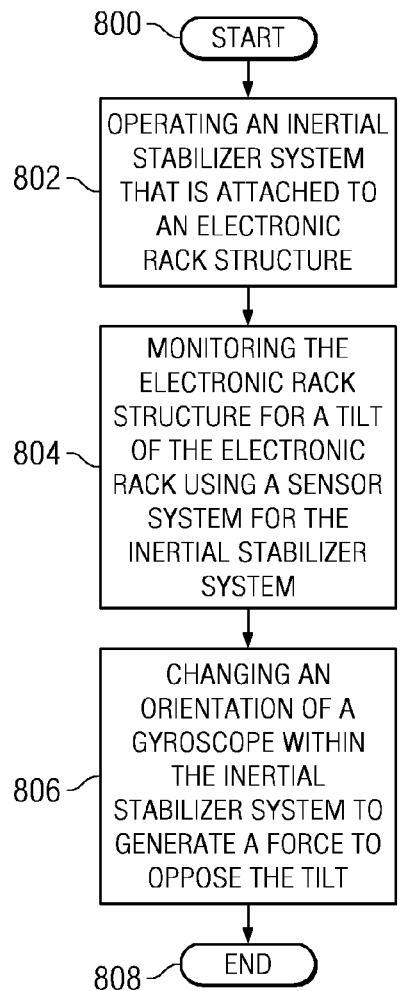
FIG. 8 is a flowchart illustrating a method for using an inertial stabilizer system in accordance with an illustrative embodiment.

FIG. 8 is a flowchart illustrating a method for using an inertial stabilizer system, in accordance with an illustrative embodiment. The method illustrated in FIG. 8 may be implemented in a component, such control logic 200 in FIG. 2. Control logic may be executed by controller in FIG. 7. The process begins (step 800) by operating an inertial stabilizer system that is attached to an electronic rack structure (step 802). Next, the electronic rack structure is monitored, using a sensor system for the inertial stabilizer system, to detect a tilt of the electronic rack structure (step 804). When a tilt of the electronic rack structure is detected, the orientation of the gyroscope within the inertial stabilizer system is modified to generate a force to oppose the tilt (step 806). Process 800 then terminates (step 808).

FIG. 9 is a flowchart illustrating a method for using an inertial stabilizer system, in accordance with an illustrative embodiment. The method illustrated in FIG. 9 may be implemented in a component, such control logic 200 in FIG. 2. Control logic 200 may be executed by controller 716 in FIG. 7. The process is initiated (step 900) in response to a user activation of a switch for a power supply. The activation of the switch provides power to the rotor motor, the precession control motor of the gyroscope, and the controller. Next, controller determines whether the inertial stabilizer system is installed and attached (step 902). Responsive to determining that inertial stabilizer system is not installed, controller suspends further action and awaits an indication that the apparatus is properly installed (step 904).

Next, the controller determines whether the electronic rack structure parameters are known (step 906). The electronic rack structure parameters can be input by a user using the keypad on the user interface (step 910), or the parameters can be retrieved from a memory connected to the controller (step 908). Once the parameters are identified, the controller 716 calculates the required rotor spin speed using the inputted or retrieved parameters (step 912). Next, the required energy to generate the spin speed is determined (step 914) and displays the minutes of protection remaining. The controller then determines whether there is a sufficient charge level in the power supply to accommodate the required energy and spin speed (step 916) and also calculates the time period for which the controller can continue to keep the rotor spinning and still have enough energy to drive the Precision Control Motor to protect against rack tilt over. If there is insufficient charge level, then controller waits until a charge level that accommodates the required energy and spin speed is reached (step 918).

Once the required charge level is reached, the failure check routines are invoked (step 920) to determine whether a failure is occurring in the operating status of the inertial stabilizer system (step 922). If a failure is identified, the failure indicator is turned on and the controller suspends operation until the failure is corrected (step 924). If no failure is determined, the rotor is spun to the required spin speed (step 926). The controller checks to see if the required spin speed is reached (step 928) and once the required spin speed is reached, the safe-move indicator is turned on (step 930). Once it is determined the inertial stabilizer system is safe to move, controller begins monitoring the operating status (step 932) of the inertial stabilizer system. If it is determined the rotor is not spinning at the required spin speed, the emergency control and failure routines, such as failure routines and emergency procedures 230, emergency control module 250 and dynamic force calculation 234 in FIG. 2, are invoked (step 934) with the process terminating thereafter (step 936).

Figure 10:
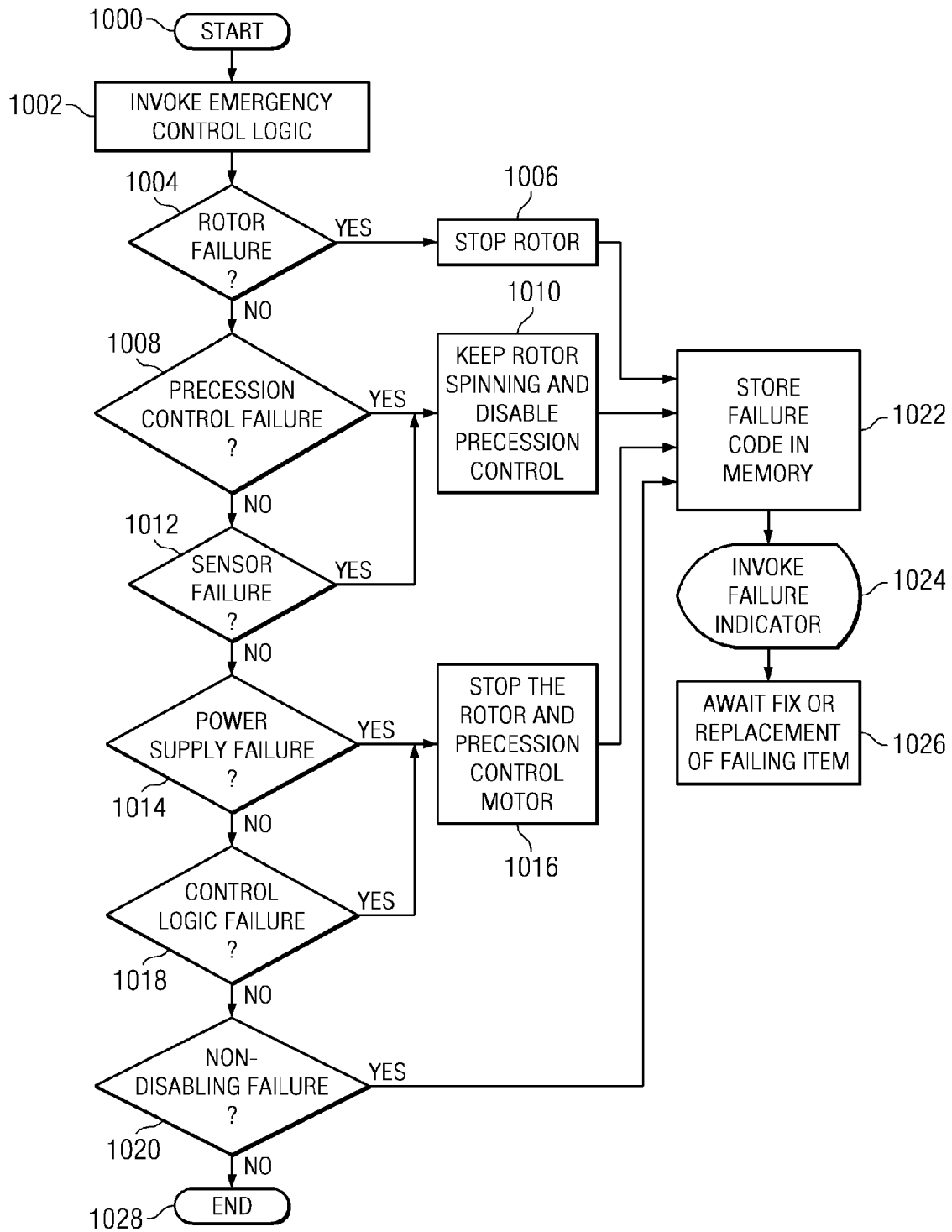
FIG. 10 is a flowchart illustrating a method for identifying an operating failure in an inertial stabilizer system in accordance with an illustrative embodiment.

FIG. 10 is a flowchart illustrating the method for identifying an operating failure in an inertial stabilizer system, in accordance with an illustrative embodiment. The method of FIG. 10 may be implemented in a component, such as control logic 200 in FIG. 2. Control logic 200 may be executed by controller 716 of FIG. 7. The process is initiated (step 1000) and the emergency control logic module is invoked (step 1002). The controller performs several checks to identify a failure in the operation of the inertial stabilizer system. In step 1004, controller determines if a failure in the operation of the rotor motor is present. If a failure in the operation of the rotor motor is present, controller stops the rotor motor (step 1006), stores the failure code in memory (step 1022), turns on the failure indicator (step 1024) and suspends operation of the inertial stabilizer system until the failure is corrected or the failing item replaced (step 1026).

If the rotor motor is not failing, the process checks the precession control motor to determine whether the precession control motor is operating properly (step 1008). If the precession control motor is determined to be failing, the precession control motor is disabled (step 1010), while the rotor motor continues to spin. A failure code is stored in memory (step 1022), the failure indicator is turned on (step 1024) and controller suspends further operation of the inertial stabilizer system until the precession control motor is repaired or replaced (step 1026).

If no problem is present in the operation of the precession control motor, the sensors are checked (step 1012). If the sensors are determined to not be functioning properly, the precession control motor is either stopped or left in a static velocity drive state, while the rotor motor continues to spin to provide fixed amount of anti-tilt force. The failure code is stored in memory (step 1022), the failure indicator is turned on (step 1024) and the controller suspends further operation until the precession control motor is fixed (step 1026).

In step 1014, the power supply is checked to determine whether the power supply is failing. If the power supply is failing, the controller stops the rotor motor and the precession control motor (step 1016), stores the failure code in memory (step 1022), turns on the failure indicator (step 1024) and the controller suspends further operation until the precession control motor is fixed (step 1026).

If there is a control logic failure (step 1018), the rotor and precession control motors are stopped (step 1016). The failure code is stored in memory (step 1022), the failure indicator is turned on (step 1024) and the controller suspends further operation of the inertial stabilizer system until the precession control motor is fixed (step 1025). The inertial stabilizer system is suspended until the failure is corrected or the failing item replaced. If there is a non-disabling failure (step 1020), the rotor and precession control motors are not stopped. The failure code is stored in memory (step 1022), and the failure indicator is turned on (step 1024) and continues to display until the failure is corrected or the failing item replaced. The process then terminates (step 1028).

Figure 11:
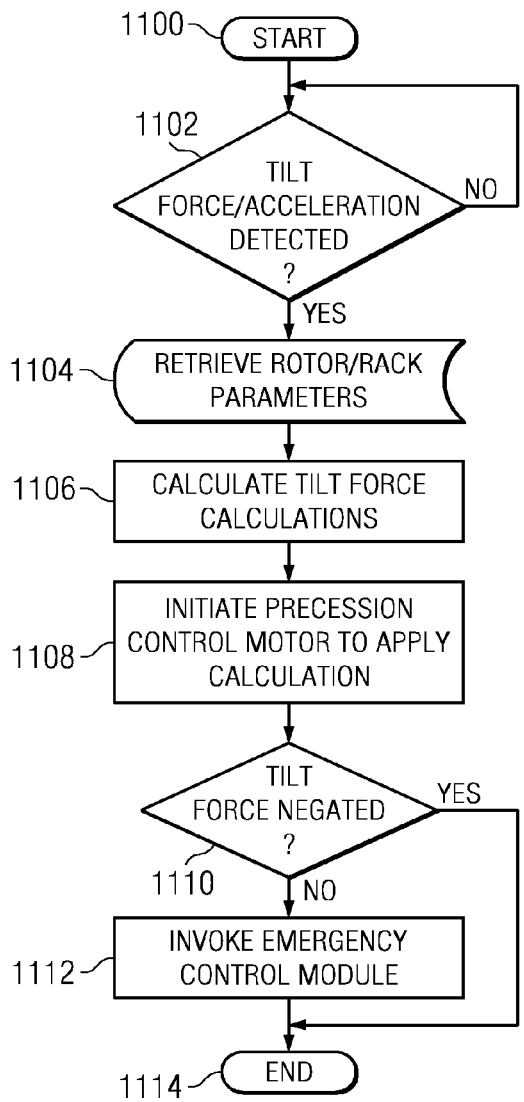
FIG. 11 is a flowchart illustrating a method for identifying an electronic rack structure tilt in accordance with an illustrative embodiment.

FIG. 11 is a flowchart illustrating a method for identifying an electronic rack structure tilt, in accordance with an illustrative embodiment. The method of FIG. 11 is implemented by a controller, such as controller 716 of FIG. 7. The method begins (step 1100) with the detecting of a tilt in an electronic rack structure. When a tilt is detected (step 1102) or sensed by the accelerometers or the position/attitude sensor, the electronic rack structure and rotor parameters are retrieved from memory or received from a user using the keypad on the user interface panel (step 1104). The controller calculates the anti-tilt force required to resist the tilting of the electronic rack structure (step 1106). The required anti-tilt force is communicated to the precession control motor to begin applying the required anti-tilt force to oppose the direction of the tilt (step 1108). As the anti-tilt force is applied, controller determines whether the tilt has been negated (step 1110). If the tilt has not been negated, additional anti-tilt force may be provided until the tilt is negated. If the tilt cannot be negated within the physical capability of the system, the emergency control and failure modules are invoked (step 1112). If the tilt has been negated, the process then terminates (step 1114).

Thus, the illustrative embodiments provide a method and apparatus to negate an imbalance of an electronic rack structure to prevent the electronic rack structure from tilting over during movement. The different embodiments may eliminate the need for emptying the electronic rack structure, or adding weight the bottom of the electronic rack structure, to stabilize the electronic rack structure. Eliminating this need for adding additional weight to the bottom of the electronic rack structure results in reduced shipping costs for the manufacturer, installer and customer. Eliminating the need to empty the rack structure for movement also results in significant time and costs savings to the customer. Additionally, illustrative embodiments are remove-ably attached. This allows a user to move any number of electronic rack structures as long as the electronic rack structure has at least one area in or on top of the electronic rack structure in which the inertial stabilizer can be attached.

The descriptions of the various embodiments, have been presented for purposes of illustration and description, and is not intended to be exhaustive or limited to the invention in the form disclosed. Many modifications and variations will be apparent to those of ordinary skill in the art. The illustrative embodiments were chosen and described in order to best explain the principles of the invention, the practical application, and to enable others of ordinary skill in the art to understand the invention for various embodiments, with various modifications as are suited to the particular use contemplated.

What is claimed is:

1. A method for stabilizing an electronic rack structure, the method comprising:
   operating an inertial stabilizer system attached to the electronic rack structure by calculating a rotor spin speed in response to receiving a plurality of inputs, determining a required energy level to maintain the rotor spin speed, determining whether a power supply associated with a gyroscope within the inertial stabilizer system is charged, determining whether a failure is occurring in an operation of the gyroscope, and determining whether a rotor is spinning at a calculated rotor spin speed;
   monitoring the electronic rack structure using a sensor system embodied in the inertial stabilizer system to determine a change in a center of gravity of the electronic rack structure; and
   changing an orientation of the gyroscope within the inertial stabilizer system to generate a force to oppose the change in the center of gravity.

2. The method of claim 1, further comprising:
   responsive to determining that the rotor is not spinning at the calculated rotor spin speed, initiating emergency control procedures.

3. The method of claim 2, wherein changing the orientation of the gyroscope within the inertial stabilizer system comprises:
   detecting the change in the center of gravity of the electronic rack structure;
   responsive to retrieving a plurality of parameters from a memory of a data processing system, determining an anti-tilt force;
   initiating a change in a precession control drive of the gyroscope perpendicular to an axis rotation of a rotor in the gyroscope to apply the anti-tilt force; and
   responsive to determining that the center of gravity of the electronic rack structure is unchanged, invoking the emergency control procedures.

4. A computer program product comprising a computer-readable-recordable storage medium storing program code for using an inertial stabilizer system to stabilize an electronic rack structure, the computer program product comprising:
   program code, stored on the computer-readable-recordable storage medium, for calculating a rotor spin speed, responsive to receiving a plurality of inputs;

program code, stored on the computer-readable-recordable storage medium, for determining a required energy level to maintain the rotor spin speed;

program code, stored on the computer-readable-recordable storage medium, for determining whether a power supply associated with the inertial stabilizer system is sufficiently charged;

program code, stored on the computer-readable-recordable storage medium, for determining whether a failure is occurring in an operation of the inertial stabilizer system; and program code, stored on the computer-readable-recordable storage medium, for determining whether a rotor of the inertial stabilizer system is spinning at a calculated rotor spin speed.

5. The computer program product of claim 4, further comprising:

program code, stored on the computer-readable-recordable storage medium, for initiating emergency control procedures, responsive to determining that the rotor is not spinning at the calculated rotor spin speed.

6. The computer program product of claim 5, further comprising:

program code, stored on the computer-readable-recordable storage medium, for detecting a change in a tilt, rate of tilt, and change in rate of tilt of the electronic rack structure;

program code, stored on the computer-readable-recordable storage medium, for determining an anti-tilt force, responsive to retrieving a plurality of parameters from a memory of a data processing system;

program code, stored on the computer-readable-recordable storage medium, for initiating the inertial stabilizer system to apply the anti-tilt force; and program code, stored on the computer-readable-recordable storage medium, for invoking the emergency control procedures, responsive to determining that a center of gravity of the electronic rack structure is unchanged.

* * * * *